United States Patent
Macey et al.

(10) Patent No.: US 11,307,234 B2
(45) Date of Patent: Apr. 19, 2022

(54) METHOD AND SYSTEM FOR AGGREGATION AND PRESENTATION OF ELECTROMAGNETIC FIELD DATA

(71) Applicant: CommScope Technologies LLC, Hickory, NC (US)

(72) Inventors: Gregory A. Macey, Leesburg, VA (US); Laura R. Fontaine, McLean, VA (US); Andrew E. Beck, Ashburn, VA (US)

(73) Assignee: CommScope Technologies LLC, Hickory, NC (US)

( * ) Notice: Subject to any disclaimer, the term of this patent is extended or adjusted under 35 U.S.C. 154(b) by 335 days.

(21) Appl. No.: 16/479,108

(22) PCT Filed: Dec. 15, 2017

(86) PCT No.: PCT/US2017/066598
§ 371 (c)(1),
(2) Date: Jul. 18, 2019

(87) PCT Pub. No.: WO2018/151787
PCT Pub. Date: Aug. 23, 2018

(65) Prior Publication Data
US 2019/0383867 A1 Dec. 19, 2019

Related U.S. Application Data (60) Provisional application No. 62/460,666, filed on Feb. 17, 2017.

(51) Int. Cl.
*G06F 30/20* (2020.01)
*G01R 29/08* (2006.01)
(Continued)

(52) U.S. Cl.
CPC ........ *G01R 29/0892* (2013.01); *G06F 30/20* (2020.01); *G06F 2111/10* (2020.01); *G06Q 50/26* (2013.01)

(58) Field of Classification Search
CPC ... G01B 29/0892; G06F 30/20; G06F 16/951; H04L 63/1416
See application file for complete search history.

(56) References Cited

U.S. PATENT DOCUMENTS 3,761,940 A * 9/1973 Hollingsworth ....... H01Q 21/29
343/826
5,953,669 A 9/1999 Stratis et al.
(Continued)

FOREIGN PATENT DOCUMENTS

CA 2684446 A1 5/2010
CN 101854642 A 10/2010
(Continued)

OTHER PUBLICATIONS

European Patent Office, "Extended European Search Report from EP Application No. 17896808.7" from Foreign Counterpart to U.S. Appl. No. 16/479,108, filed Nov. 2, 2020, pp. 1 through 35, Published: EP.
(Continued)

*Primary Examiner* — Thai Q Phan
(74) *Attorney, Agent, or Firm* — Fogg & Powers LLC (57) ABSTRACT

In one embodiment, a method of estimating electromagnetic field data. The method comprises: identifying at least one electromagnetic field source in a geographical region; identifying at least one transmission model for the at least one electromagnetic field source based upon electromagnetic field data corresponding to the at least one electromagnetic field source; identifying at least one propagation model for the at least one electromagnetic field source based upon the electromagnetic field data and geographical terrain of the
(Continued)

geographical region; and generating electromagnetic field estimates based upon the electromagnetic field data, the at least one transmission model and the at least one propagation model.

20 Claims, 3 Drawing Sheets

(51) Int. Cl.
*G06Q 50/26* (2012.01)
*G06F 111/10* (2020.01)

(56) References Cited

U.S. PATENT DOCUMENTS

| | | | |
|---|---|---|---|
| 6,580,911 | B1 | 6/2003 | Clancy |
| 8,515,925 | B2 | 8/2013 | Rappaport |
| 8,660,498 | B2 | 2/2014 | Gurney et al. |
| 9,100,974 | B2 | 8/2015 | Carey et al. |
| 9,198,044 | B2 * | 11/2015 | Solondz ............... H04L 9/006 |
| 9,330,555 | B2 | 5/2016 | Tesanovic et al. |
| 9,338,787 | B2 | 5/2016 | Gloss |
| 9,476,717 | B2 | 10/2016 | Haverinen et al. |
| 9,551,781 | B2 * | 1/2017 | Baxley ............... G06K 9/00771 |
| 9,880,256 | B2 * | 1/2018 | Baxley ............... H04W 4/70 |
| 2006/0269020 | A1 | 11/2006 | Vicharelli et al. |
| 2007/0024293 | A1 | 2/2007 | Kosaka et al. |
| 2010/0125438 | A1 | 5/2010 | Audet |
| 2010/0330919 | A1 | 12/2010 | Gurney et al. |
| 2011/0287801 | A1 | 11/2011 | Levin et al. |
| 2015/0042309 | A1 | 2/2015 | Kurihara et al. |
| 2015/0257007 | A1 * | 9/2015 | Solondz ............... H04L 9/3234 |
| | | | 713/154 |
| 2016/0127931 | A1 * | 5/2016 | Baxley ............... G06F 16/951 |
| | | | 455/67.16 |
| 2016/0269917 | A1 | 9/2016 | Hillegas, Jr. et al. |
| 2021/0075502 | A1 * | 3/2021 | Babich ............... H04B 10/25 |

FOREIGN PATENT DOCUMENTS

| | | |
|---|---|---|
| JP | 2010190708 A | 9/2010 |
| JP | 5410827 B2 | 2/2014 |

OTHER PUBLICATIONS

International Bureau, "International Preliminary Report on Patentability from PCT Application No. PCT/US2017/066598 dated Aug. 29, 2019", from Foreign Counterpart to U.S. Appl. No. 16/479,108, pp. 1-6, Published: WO.
International Searching Authority, "International Search Report and Written Opinion from PCT Application No. PCT/US2017/066598 dated Apr. 16, 2018", from Foreign Counterpart to U.S. Appl. No. 16/479,108, pp. 1-9, Published: WO.
Reichel, "Electromagnetic Fields: Health Hazards", at least as early as Aug. 16, 2019, pp. 1-2, http://lornareichel.com/emf-home-safety-assessments/electromagnetic-fields-health-hazards/.
Wikipedia, "Electric power transmission", Aug. 13, 2019, pp. 1-12, Wikipedia.
Wikipedia, "Electromagnetic radiation and health", Aug. 5, 2019, pp. 1-7, Wikipedia.
Wikipedia, "Mobile phone radiation and health", Aug. 12, 2019, pp. 1-8, Wikipedia.

* cited by examiner

METHOD AND SYSTEM FOR AGGREGATION AND PRESENTATION OF ELECTROMAGNETIC FIELD DATA

CROSS-REFERENCE TO RELATED APPLICATIONS

This application is a 371 National Stage application of International Patent Application No. PCT/US2017/066598 filed on Dec. 15, 2017, which claims the benefit of U.S. Provisional Patent Application No. 62/460,666 filed on Feb. 17, 2017, the contents of both of which are hereby incorporated in their entirety

BACKGROUND

Electromagnetic fields (EMFs) are ubiquitous with the widespread use of man-made systems such as communications systems, alternating current power distribution systems, and electrical equipment. Electromagnetic fields can also occur naturally, e.g. due to solar events.

Whether man-made or naturally occurring, electromagnetic fields can interfere with the operation of communications systems and power grids. Further, electromagnetic fields are alleged to be potential biological hazards.

For example, undesired electromagnetic fields can raise the noise floor of communications systems requiring such systems to have higher output power to overcome the noise. To ascertain potential interference and biological hazards, or to otherwise ascertain electromagnetic field strength, there is a need to map electromagnetic fields to identify and ascertain such risks.

Present modelling systems typically rely upon a single database of EMF sources that is not comprehensive model of electromagnetic fields in a geographical region. Thus, EMF in a geographical region can not be modelled accurately. Therefore, there is also a need to more comprehensively model sources of EMF in a geographic region.

SUMMARY OF THE INVENTION

In one embodiment, a method of estimating electromagnetic field data. The method comprises: identifying at least one electromagnetic field source in a geographical region; identifying at least one transmission model for the at least one electromagnetic field source based upon electromagnetic field data corresponding to the at least one electromagnetic field source; identifying at least one propagation model for the at least one electromagnetic field source based upon the electromagnetic field data and geographical terrain of the geographical region; and generating electromagnetic field estimates based upon the electromagnetic field data, the at least one transmission model and the at least one propagation model.

DETAILED DESCRIPTION

A technique is provided for aggregating sources of EMFs, and modelling the electromagnetic fields of the aggregated sources. The technique provides a comprehensive model of electromagnetic field in a geographic region.

Figure 1:
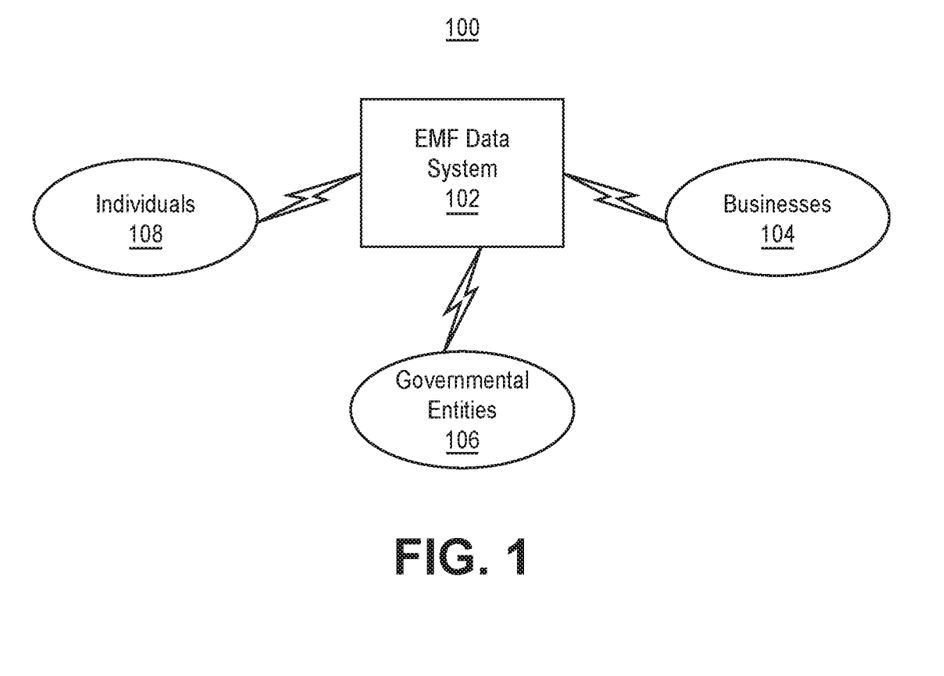
FIG. 1 illustrates one embodiment of an electromagnetic field data system network.

FIG. 1 illustrates one embodiment of an electromagnetic field data system network 100. The electromagnetic field (EMF) data system network 100 includes an electromagnetic field data system 102 coupled to businesses 104, governmental entities 106, and individuals 108. Each of the businesses 104, governmental entities 106, and individuals 108 may be users of, and/or suppliers of data to, the electromagnetic field data system 102. In one embodiment, the businesses 104 include real estate businesses (such as the National Association of Realtors for realtor.com website and multiple listing service), cellular network service providers, electric utilities, radio and television broadcasters. In another embodiment, individuals and businesses may voluntarily contribute electromagnetic field data to the electromagnetic field data system 102. Governmental entities 106 include the U.S. Federal Communications Commission (FCC), federal, state and local health agencies, and municipal planning agencies. Government entities such as the FCC maintain databases of records of electromagnetic field sources such as radio and television broadcasters and power line locations. In a further embodiment, the operator of the electromagnetic field data system 102 may receive, or obtain and load, such data into the electromagnetic field data system 102.

The electromagnetic field data system 102 takes publicly and privately provided data on sources of electromagnetic fields, e.g. for a municipality, state, country, or world, and can determine and display the level of electromagnetic fields in one or more frequency bands in a particular geographic region. The displayed data can be in a variety of formats.

Electromagnetic field data may be provided in different formats, e.g. information about point sources, measurements at different locations, etc. Also, different measurement units may be used, e.g. for electric fields (volts per meter, Tesla, etc.), for magnetic fields (amps per meter, Gauss, etc.), and for electromagnetic fields (watts per meter squared, dBm, etc.) The disparity of data formats is translated, to the extent possible, so that the corresponding electromagnetic field data can be estimated in a geographical region.

Figure 2:
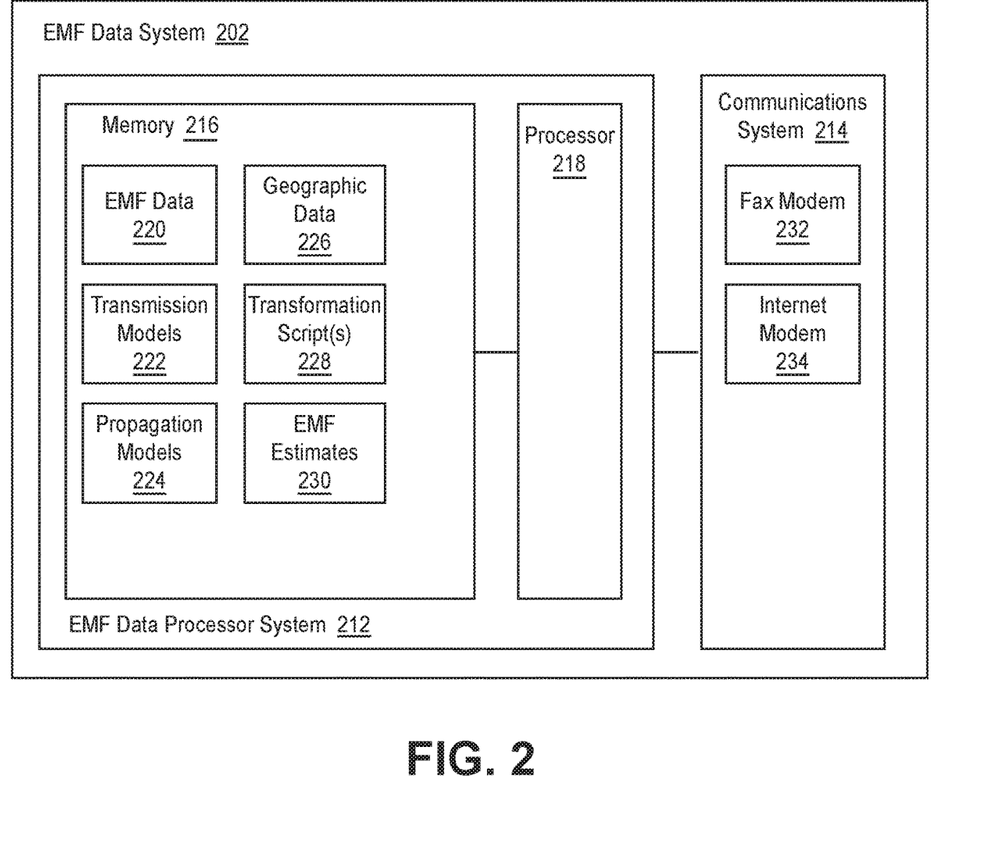
FIG. 2 illustrates one embodiment of an electromagnetic field data system.

FIG. 2 illustrates one embodiment of an electromagnetic field (EMF) data system 202. The electromagnetic field data system 202 comprises an electromagnetic field (EMF) data processor system 212 coupled to a communications system 214. The electromagnetic field data processor system 212 stores the aggregated electromagnetic field data received from one or more sources, and processes user requests to estimate levels of electromagnetic field energy in a geographical region.

In one embodiment, the electromagnetic field (EMF) data system 202 is located remotely from the users, e.g. in the cloud or in an operations center of the service provider that makes available the electromagnetic field data system 202. The communications system 214 permits entities (i.e. businesses, individuals, and governmental entities) to submit data, and request estimates. In one embodiment, the communications system includes a facsimile (FAX) modem 232 and an Internet modem 234. Data can be received from and transmitted to users of the electromagnetic field data system 202 by at least one of the modems.

The electromagnetic field data processor system 212 may be any type of state machine. In one embodiment, the electromagnetic field (EMF) data processor system 212 includes a memory 216 coupled to a processor 218. In another embodiment, the processor 218 may be a central processor unit, an application specific integrated circuit, and/or a field programmable gate array. The memory 216 may be any type of semiconductor memory (e.g. random access memory, flash memory, and/or read only memory), magnetic memory (e.g. a hard drive), or optical memory (optical reader and a DVD and/or Blu Ray disc).

In one embodiment, the memory 216 includes electromagnetic field data database (EMF Data) 220, transmission models database (transmission models) 222, propagation models database (propagation models) 224, geographic data database (geographic data) 226, transformation script(s) 228, and electromagnetic field (EMF) estimates database 230. Such databases may be either conventional databases or data storage formats of any type, e.g. data files. Although recited as separate databases, one or more of such databases may be combined.

The EMF Data 220 is an aggregate of electromagnetic field data. In one embodiment, the EMF Data 220 includes information about electromagnetic field radiators including location and corresponding information, e.g. obtained from different sources. In another embodiment, the user can input data about predicted (not currently active) electromagnetic field radiators. This allows the user to generate EMF estimates 230, with the EMF data system 202, including data about one or more predicted electromagnetic field radiators.

In one embodiment, such corresponding information may include transmitter type, transmitter power, antenna design, and/or antenna elevation. In another embodiment, such corresponding information may include in-band and out of band power of the transmitter or radiated by the antenna, antenna radiation pattern, radiation angle, and/or gain.

In one embodiment, EMF data about electromagnetic field radiators may be measured or previously estimated points and/or contours of electromagnetic field energy or power from a point through a range of distances. In another embodiment, data in such format need not be processed by the subsequently described transmitter and propagation models because the data has been transmitted and propagated.

In one embodiment, to the extent that any EMF Data 220 is in a format that needs to be changed, e.g. the units of measure do not conform with those typically utilized by the electromagnetic field data processor system 212, the transformation script(s) 228 transform the data into a useable format. In one embodiment, the transformation script(s) 228 are executed on the processor 218.

The geographic data 226 includes models of geographic terrain of and obstacles (such as large buildings) in a municipality, state, country and/or world. The transmission models 222 include models of different types of electromagnetic field radiators, such as models of the transmitters and antennas used by the electromagnetic field radiators. Models as used herein refer to mathematical models used to simulate respectively electromagnetic field radiators (e.g. antennas and/or transmitters) and modes of propagation. Selection of a specific transmission model, from the transmission models 222, for an electromagnetic field radiator depends upon information provided in the EMF Data 220 for the corresponding electromagnetic field radiator, such as transmitter type, antenna design, and antenna height. In one embodiment, with respect to transmitters, if not provided in the EMF Data 220, the transmission models 222 estimate transmitter operating band and out of band power levels, e.g. provided to an antenna. In another embodiment, with respect to antennas, the transmission models 222 can be used to estimate radiation patterns, including gain, radiation polarization, radiation angle, based upon antenna design, height, and ground plane. Alternatively, part or all of the transmitter model may not be required if the EMF Data 220 includes some or all of the corresponding information such as estimated transmitter operating band and out of band power levels, radiation patterns, including gain, radiation polarization, and radiation angle.

The propagation models 224 include different types of models, which describe path loss, over geographic region, of radiating electromagnetic fields for different propagation conditions. Such propagation models 224, and selection of propagation models for a given electromagnetic field radiator, depend upon corresponding propagation path (e.g. including distance, geographical terrain, and physical obstructions such as buildings), antenna characteristics (e.g. angle of radiation and radiation polarization), atmospheric conditions (e.g. ionospheric conditions and the existence of meteor showers), and time (such as time of day and/or solar cycle). The propagation models 224 may be public and/or proprietary models (e.g. of the electromagnetic field data system service provider). In one embodiment, the EMF data 220 stores an identifier of corresponding transmitter models and/or propagation models with corresponding electromagnetic field radiators, e.g. which may be provided by third parties such as businesses, individuals, governmental agencies, and/or the operator of the electromagnetic field data system 202. In another embodiment, the transmission and propagation models are executed on the processor 218 using data from the EMF data 220 and geographic data 226 to estimate electromagnetic fields.

Figure 3:
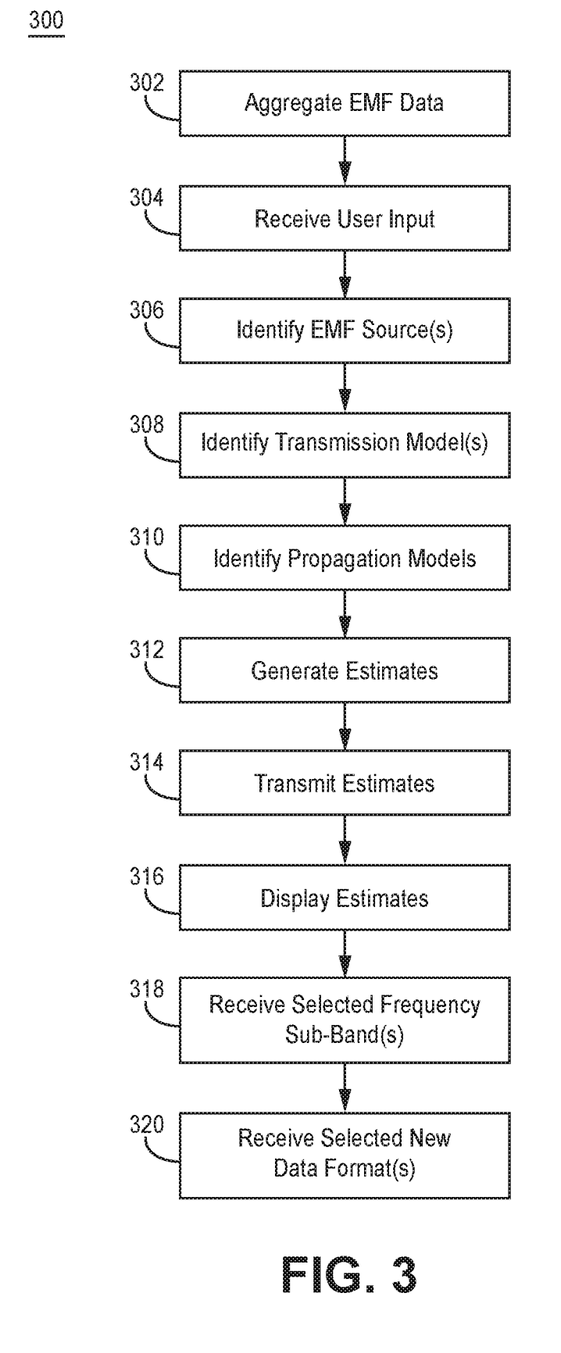
FIG. 3 illustrates one embodiment of operation of the exemplary electromagnetic field data system network.

FIG. 3 illustrates one embodiment of operation of the exemplary electromagnetic field data system network 100. The embodiment of method 300 shown in FIG. 3 is described here as being implemented in the systems shown in FIGS. 1 and 2, though it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In one embodiment, in block 302, EMF data 220 is aggregated from one or more sources. In another embodiment, to the extent any of the aggregated EMF data is in an inappropriate or undesired format, that format is transformed, e.g. by transformation script(s) 228, to a desired format.

In one embodiment, during aggregation, electromagnetic field data is uploaded and stored in the EMF data 220. The EMF data 220 may originate with and/or may be uploaded by businesses, individuals, and governmental entities. In another embodiment, the operator of the electromagnetic field data system 202 may also originate and/or upload EMF data 220.

In one embodiment, in block 304, receive user input where a user selects at least one of geographic location, frequency band(s), data format(s), time(s), and desired electromagnetic field radiator(s) for which they want to estimate electromagnetic field data. In another embodiment, the user inputs data about predicted (not currently active) electromagnetic field radiators. In a further embodiment, the electromagnetic field data system 202 periodically (e.g. periodically based upon time or based upon changes to the electromagnetic field data 220) generates electromagnetic field estimates over a geographic region, e.g. for all frequency bands, times, and/or data formats. In this embodiment, the following blocks 306, 308, 310 and 312 would be performed for all electromagnetic field radiators in the geographic region. Subsequently, the user can parse this data and generate the data for user selected specific frequency band(s), time(s), electromagnetic field radiator(s), geographic region(s), and/or data format(s). In a further embodiment, the user makes data selections first, and the electromagnetic field data system 202 generates the desired estimates in the user specified data format(s) for user selected frequency band(s), time(s), electromagnetic field radiator(s), and/or geographic region(s). These embodiments differ only principally in the order of the blocks, and the timing when the estimated data is generated. The latter embodiment will now be further exemplified.

Geographic location may be a region defined by boundaries, or a point location and a radial distance from the point location. In one embodiment, geographic location may be entered as latitude and longitude. In another embodiment, geographic location may be specified on an electronic map by creating a bounding region about the region of interest, or identifying the center point and entering the radial distance.

In one embodiment, the user selects the frequency band(s) for which the user wants electromagnetic field data estimates. In another embodiment, the user may select check boxes corresponding to individual frequency bands. In a further embodiment, the user may select frequency band(s) by adjusting the indicators on one or more sliders each of which corresponds to a frequency range.

In one embodiment, the user indicates the data format(s) that the estimated electromagnetic field data is to be displayed. In another embodiment, the format may be tabular. For example, the selected geographic region may be formed into a grid with grid regions. The tabular format would display the electromagnetic field data for each grid region in the grid. Numeric values or qualitative indicators (e.g. symbols such as signal strength bars, good service versus bad service, and/or biological health indicators such as healthy versus unhealthy) corresponding to the electromagnetic field strength at each grid point would be displayed. In another embodiment, such values and indicators indicate an estimated level of electromagnetic field energy from desired (e.g. selected) electromagnetic field radiator(s) and from undesired (i.e. interfering) electromagnetic field radiator(s), which, e.g., may diminish the sensitivity of communications systems utilizing the desired electromagnetic field radiator(s). In a further embodiment, such values and indicators indicate an estimated level of quality of service, e.g. cellular network, broadcast television, and wireless Internet service a user would receive at geographic location. In yet another embodiment, the format is graphical, e.g. on a geographic map, and graphically display the electromagnetic filed data in the desired region. The display could use contours for different levels of electromagnetic field strength, a heat map, or could display information based on the location of a cursor over a point in the region.

In one embodiment, the user indicates the time(s) for which the estimated electromagnetic field data is to be displayed. As mentioned, propagation effects, and sometimes transmitter power, may vary over time. In another embodiment, the user may select check boxes corresponding to individual times or ranges of time. In a further embodiment, the user may select range(s) of time by adjusting the indicators on one or more sliders each of which corresponds to a time range.

In one embodiment, the user indicates the electromagnetic field radiator(s) whose electromagnetic fields the user desires to analyze. The electromagnetic field data system 202 subsequently estimates the electromagnetic fields of the indicated electromagnetic field radiator(s).

In block 306, actual and/or predicted sources of electromagnetic fields, e.g. electromagnetic field radiators, are identified, e.g. by analyzing the electromagnetic field data 220 on the processor 218. In one embodiment, sources of electromagnetic fields are identified in just the selected geographic region. In another embodiment, sources of electromagnetic fields are identified in the selected geographic region, and outside the selected geographic region if they are initially estimated to generate, e.g. interfering, electromagnetic fields in the selected geographic region. In a further embodiment, the electromagnetic field data system 202 subsequently estimates the electromagnetic fields of such electromagnetic field radiators not indicated, or selected, by the user to estimate interfering electromagnetic field strengths, e.g. which may diminish the sensitivity of communication systems utilizing the indicated electromagnetic field radiator(s).

In one embodiment, in block 308, transmission models (corresponding to the electromagnetic field sources whose electromagnetic fields are to be estimated) are identified, e.g. as described above. In one embodiment, the transmission models are identified based upon information stored with each electromagnetic field source, e.g. in the electromagnetic field data 220. In block 310, propagation models, corresponding to the electromagnetic field sources whose electromagnetic fields are to be estimated, e.g., corresponding selected transmission models, terrain (e.g. mountains, valleys, bodies of water) of and obstacles (e.g. buildings) in the selected geographical region, selected frequency band(s), and/or time, are identified.

In block 312, EMF estimates 230 are generated for the selected geographic region. In another embodiment, the EMF estimates 230 are generated by processing data corresponding to the electromagnetic field source(s) (whose electromagnetic fields are to be estimated), and selected transmission model(s) and propagation model(s). In a further embodiment, the estimated electromagnetic fields are stored in the EMF estimates 230.

In block 314, the EMF estimates 230 are transmitted to the user. In block 316, the EMF estimates 230 are displayed to the user. In one embodiment, the EMF estimates 230 include information about the electromagnetic field of the desired signal of a selected electromagnetic field radiator(s), and information about the electromagnetic fields of interfering electromagnetic field radiator(s), e.g. a noise floor level generated by such interfering electromagnetic field radiator(s). In another embodiment, the EMF estimates 230 are electromagnetic field strengths at one or more frequencies at one or more geographic locations.

In one embodiment, in block 318, receive user selected frequency sub-band(s) within the band(s) initially selected for which the estimate was performed. In another embodiment, in block 320, receive user selected new data format(s).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims. For example, a signal may be a voltage signal or a current signal.

Example Embodiments

Example 1 includes an electromagnetic field data system, comprising: an electromagnetic field data processor system;

a communications system coupled to the electromagnetic field data processor system; wherein the electromagnetic field data processor system comprises a memory coupled to a processor; wherein the memory comprises electromagnetic field data, transmission models, and propagation models; wherein the communications systems comprise at least one of an Internet modem and a facsimile modem; and wherein the electromagnetic field data processor system is configured to: select a transmission model and a propagation model based upon electromagnetic field data of an electromagnetic radiator; and generate electromagnetic field estimates of the electromagnetic radiator based upon the selected transmission model and propagation model, and the electromagnetic field data of the electromagnetic radiator.

Example 2 includes the electromagnetic field data system of Example 1, wherein the memory further comprises geographic data; and wherein the electromagnetic field data processor system is further configured to generate electromagnetic field estimates of the electromagnetic radiator based upon the geographic data.

Example 3 includes the electromagnetic field data system of Example 2, wherein the geographic data includes terrain data and obstacle data.

Example 4 includes the electromagnetic field data system of any of Examples 1-3, wherein the memory further comprises electromagnetic field estimates.

Example 5 includes the electromagnetic field data system of any of Examples 1-4, wherein generate electromagnetic field estimates of the electromagnetic radiator comprises generate electromagnetic field information of a desired electromagnetic field radiator and an electromagnetic field of an interfering electromagnetic field radiator.

Example 6 includes the electromagnetic field data system of any of Examples 4-5, wherein the electromagnetic field data comprises at least one of electromagnetic field radiator location, transmitter type, transmitter power, antenna design, antenna elevation, in-band transmitter power, out of band transmitter power, in-band antenna radiation power, out of band antenna radiation power, antenna radiation pattern, radiation angle, and antenna gain.

Example 7 includes the electromagnetic field data system of any of Examples 1-6, wherein the memory further comprises at least one transformation script configured to transform electromagnetic field data from a first format to a second format.

Example 8 includes the electromagnetic field data system of any of Examples 1-7, wherein the at least one transmission model comprises at least one model of a transmitter and at least one model of an antenna.

Example 9 includes a method of estimating electromagnetic field data, comprising: identifying at least one electromagnetic field source in a geographical region; identifying at least one transmission model for the at least one electromagnetic field source based upon electromagnetic field data corresponding to the at least one electromagnetic field source; identifying at least one propagation model for the at least one electromagnetic field source based upon the electromagnetic field data and geographical terrain of the geographical region; and generating electromagnetic field estimates based upon the electromagnetic field data, the at least one transmission model and the at least one propagation model.

Example 10 includes the method of Example 9, further comprising displaying the electromagnetic field estimates.

Example 11 includes the method of any of Examples 9-10, wherein the electromagnetic field estimates comprises information about at least one of an electromagnetic field of a desired electromagnetic field radiator and an electromagnetic field of an interfering electromagnetic field radiator.

Example 12 includes the method of any of Examples 9-11, further comprising aggregating electromagnetic field data.

Example 13 includes the method of Example 12, further comprising uploading electromagnetic field data.

Example 14 includes the method of any of Examples 12-13, further comprising transforming electromagnetic field data.

Example 15 includes the method of any of Examples 9-14, further comprising receiving user input of at least one of frequency band selection, electromagnetic field radiator selection, data format selection, geographic region selection, time selection, and data about a predicted electromagnetic field radiator.

Example 16 includes the method of any of Examples 9-15, further comprising receiving user input of a frequency sub-band.

Example 17 includes a non-transitory computer readable medium storing a program causing a computer to execute a process for estimating electromagnetic radiation, the process comprising: identifying at least one electromagnetic field source in a geographical region; identifying at least one transmission model for the at least one electromagnetic field source based upon electromagnetic field data corresponding to the at least one electromagnetic field source; identify at least one propagation model for the at least one electromagnetic field source based upon the electromagnetic field data and geographical terrain of the geographical region; and generate electromagnetic field estimates based upon the electromagnetic field data, the at least one transmission model and the at least one propagation model.

Example 18 includes the non-transitory computer readable medium of Example 17, wherein the process further comprises aggregating electromagnetic field data.

Example 19 includes the non-transitory computer readable medium of Example 18, wherein the process further comprises transforming electromagnetic field data.

Example 20 includes the non-transitory computer readable medium of any of Examples 17-19, wherein the process further comprises receiving user input of at least one of frequency band selection, electromagnetic field radiator selection, data format selection, geographic region selection, time selection, and data about a predicted electromagnetic field radiator.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

The invention claimed is:

1. An electromagnetic field data system, comprising:
electromagnetic field data processor circuitry;
wherein the electromagnetic field data processor circuitry comprises electromagnetic field data, transmission models, and propagation models; and
wherein the electromagnetic field data processor circuitry is configured to:
receive a user input of a geographic region, at least one frequency band, and at least one electromagnetic field radiator;
select a transmission model for each electromagnetic field radiator based upon electromagnetic field data for a corresponding electromagnetic radiator received by the user input;

select at least one propagation model for each electromagnetic field radiator based upon at least one of a propagation path, the at least one frequency band, atmospheric conditions, and a time; and generate electromagnetic field estimates for each of the at least one electromagnetic field radiator, in the geographic region and in the at least one frequency band, based upon a transmission model for a respective electromagnetic field radiator, at least one propagation model for the respective electromagnetic field radiator, and the electromagnetic field data for the respective electromagnetic field radiator.

2. The electromagnetic field data system of claim 1, wherein the electromagnetic field data processor circuitry further comprises geographic data;

wherein generating the electromagnetic field estimates for each of the at least one electromagnetic field radiator comprises generating the electromagnetic field estimates of each of the at least one electromagnetic field radiator based upon the geographic data.

3. The electromagnetic field data system of claim 2, wherein the geographic data includes terrain data and obstacle data.

4. The electromagnetic field data system of claim 1, wherein the electromagnetic field data processor circuitry is further configured to receive electromagnetic field data from at least two sources of data.

5. The electromagnetic field data system of claim 1, wherein generate the electromagnetic field estimates of each of the at least one electromagnetic radiator comprises generate electromagnetic field estimates of an electromagnetic field radiator and electromagnetic field estimates of another electromagnetic field radiator interfering with the electromagnetic field radiator.

6. The electromagnetic field data system of claim 1, wherein the electromagnetic field data comprises at least one of an electromagnetic field radiator location, a transmitter type, a transmitter power, an antenna design, an antenna elevation, an in-band transmitter power, an out of band transmitter power, an in-band antenna radiation power, an out of band antenna radiation power, an antenna radiation pattern, a radiation angle, and an antenna gain.

7. The electromagnetic field data system of claim 1, wherein the electromagnetic field data processor circuitry further comprises at least one transformation script configured to transform electromagnetic field data from a first format to a second format.

8. The electromagnetic field data system of claim 1, wherein the transmission model comprises at least one model of a transmitter and at least one model of an antenna.

9. A method of estimating electromagnetic fields, comprising:

receiving a user input of a geographic region, at least one frequency band, and at least one electromagnetic field radiator;

selecting a transmission model for each electromagnetic field radiator based upon electromagnetic field data for a corresponding electromagnetic field radiator received by the user input;

selecting at least one propagation model for each electromagnetic field radiator based upon at least one of a propagation path, the at least one frequency band, atmospheric conditions, and a time; and generating electromagnetic field estimates for each of the at least one electromagnetic field radiator, in the geographic region and in the at least one frequency band, based upon the electromagnetic field data for a respective electromagnetic field radiator, a transmission model for the respective electromagnetic field radiator, and at least one propagation model for the respective electromagnetic field radiator.

10. The method of claim 9, further comprising receiving electromagnetic field data from at least two sources of data.

11. The method of claim 9, wherein generating the electromagnetic field estimates for each of the at least one electromagnetic field radiator further comprises generating electromagnetic field estimates of an electromagnetic field radiator and electromagnetic field estimates of another electromagnetic field interfering with the electromagnetic field radiator.

12. The method of claim 9, wherein generating the electromagnetic field estimates for each of the at least one electromagnetic field radiator further comprises regenerating the electromagnetic field estimates for each of the at least one electromagnetic field radiator based upon geographic data.

13. The method of claim 12, wherein the geographic data includes terrain data and obstacle data.

14. The method of claim 9, further comprising transforming electromagnetic field data from a first format to a second format.

15. The method of claim 9, wherein the transmission model comprises at least one model of a transmitter and at least one model of an antenna.

16. The method of claim 9, wherein the electromagnetic field data comprises at least one of an electromagnetic field radiator location, a transmitter type, transmitter power, an antenna design, an antenna elevation, an in-band transmitter power, out of band transmitter power, an in-band antenna radiation power, an out of band antenna radiation power, an antenna radiation pattern, a radiation angle, and am antenna gain.

17. A non-transitory computer readable medium storing a program causing a computer to execute a process for estimating electromagnetic radiation, the process comprising:

receiving a user input of a geographic region, at least one frequency band, and at least one electromagnetic field radiator;

selecting transmission model for each electromagnetic field radiator based upon electromagnetic field data for a corresponding electromagnetic field radiator received by the user input;

selecting at least one propagation model for each electromagnetic field radiator based upon at least one of a propagation path, the at least one frequency band, atmospheric conditions, and a time; and generating electromagnetic field estimates for each of the at least one electromagnetic field radiator, in the geographic region and in the at least one frequency band, based upon the electromagnetic field data for a respective electromagnetic field radiator, a transmission model for the respective electromagnetic field radiator, and at least one propagation model for a respective electromagnetic field radiator.

18. The non-transitory computer readable medium of claim 17, further comprising receiving electromagnetic field data from at least two sources of data.

19. The non-transitory computer readable medium of claim 17, wherein generating the electromagnetic field estimates for each of the at least one electromagnetic field radiator further comprises generating electromagnetic field estimates for each of the at least one electromagnetic field radiator based upon geographic data.

20. The non-transitory computer readable medium of claim 19, wherein the geographic data includes terrain data and obstacle data.

\* \* \* \* \*